United States Patent

Rutz

Patent Number: 5,846,031
Date of Patent: Dec. 8, 1998

[54] POWDER SPRAY COATING INJECTOR DEVICE

[75] Inventor: Guido Rutz, Gossau, Switzerland

[73] Assignee: Gema Volstatic AG, Switzerland

[21] Appl. No.: 698,513

[22] Filed: Aug. 15, 1996

[30] Foreign Application Priority Data

Aug. 26, 1995 [DE] Germany .................. 195 31 421.2

[51] Int. Cl.[6] ................................................. B65G 53/42
[52] U.S. Cl. ........................ 406/142; 406/152; 406/153
[58] Field of Search ................................. 406/142, 143, 406/152, 153

[56] References Cited

U.S. PATENT DOCUMENTS

| | | | |
|---|---|---|---|
| 4,105,256 | 8/1978 | Parker et al. | 302/51 |
| 5,505,566 | 4/1996 | Gruber | 406/153 |
| 5,615,980 | 4/1997 | Mauchle | 406/153 |

FOREIGN PATENT DOCUMENTS

| | | |
|---|---|---|
| 184994 | 6/1986 | European Pat. Off. . |
| 189709 | 8/1986 | European Pat. Off. . |
| 689875 | 1/1996 | European Pat. Off. . |
| 3528749 | 2/1987 | Germany . |
| 9105321 | 8/1991 | Germany . |
| 4013061 | 11/1991 | Germany . |
| 4021674 | 1/1992 | Germany . |
| 4114097 | 11/1992 | Germany . |
| 4121455 | 1/1993 | Germany . |
| 4319726 | 12/1994 | Germany . |
| 2056932 | 3/1981 | United Kingdom . |
| 2179099 | 2/1987 | United Kingdom . |

*Primary Examiner*—Gary C. Hoge
*Attorney, Agent, or Firm*—MacMillan, Sobanski & Todd, LLC

[57] ABSTRACT

Powder spray coating injector device consisting generally of three tubes nested coaxially. Fluidized powder is carried through an inner one of the tubes and compressed air is carried through annular passages between the inner tube and an intermediate tube and between the intermediate tube and an outer tube. The compressed air is used by a fluidizer to fluidize the powder coating material and by an injector to convey the fluidized powder coating material to a conventional powder spray applicator. Upstream ends of the tubes, relative to the direction of powder feeding, are connected via an adapter to an end section. The end section is provided with at least one fluidizer and the injector through which fluidized power is sucked. Any residual powder is easily cleaned from the injector device by positioning a cap over the fluidizer and injector and by delivering compressed air to the cap while fluidizing and injector air is supplied to the device.

11 Claims, 5 Drawing Sheets

POWDER SPRAY COATING INJECTOR DEVICE

TECHNICAL FIELD

The invention relates to powder spray coating and more particularly to a coating powder injector device for a powder spray coating system.

BACKGROUND ART

In a powder spray coating system, the prior art teaches a powder coating injector device which features three parallel, spaced tubes arranged side by side, of which a center tube serves to supply compressed air and the two adjacent tubes feed powder from a powder container to a spray applicator. Air flows from the bottom end of the center tube to two injector nozzles which blow the air into the bottom end of the two tubes serving to feed the powder. These air flows suck powder into the bottom end of the two tubes. The bottom end of the device is formed by a fluidizing bottom that extends beyond the cross section of all three tubes and blows air from the center tube into the powder container, so as to fluidize powder contained in it.

An airflow suction nozzle for granular and liquid material also is known. The nozzle consists of a feed tube and a compressed air supply tube coaxially surrounding and spaced from the feed tube. The compressed air supply tube is bent at its front end into the front end of the feed tube in a fashion such that an annular nozzle slot is formed between the two tube ends. The compressed air flow in the front end of the feed tube generates a vacuum that sucks the material being fed into the compressed air flow and thus into the feed tube. The nozzle does not have a device for fluidization of powdery material.

The prior art also suggests that compressed air mufflers may be used as powder filters. Further, a device is known with coaxially nested tubes. This device is immersed in a powder container up to a stop. The prior art powder injector devices are subject to contamination with powder and are not necessarily easily cleaned, for example, when changing coating powders.

DISCLOSURE OF INVENTION

An objective which the invention seeks to accomplish is creating an injector device which is not so much subject to contamination with powder and which allows easier removal of adhering powder. Powder flow direction changes or flow reversal points are avoided extensively, since they invite the risk of powder depositions on them. Also, the reversal point surfaces may be subject to being worn or eroded by the abrasive effect of the flowing powder. Furthermore, an even feeding of the powder is accomplished, without fluctuations when only small amounts of powder are being fed. Likewise, the invention allows for easy and quick exchange of essential parts, without requiring special tools, long disassembly times, or long down times.

Other objects and advantages of the invention will become apparent from the following detailed description of the invention and the accompanying drawings.

BEST MODE FOR CARRYING OUT THE INVENTION

Figure 1:
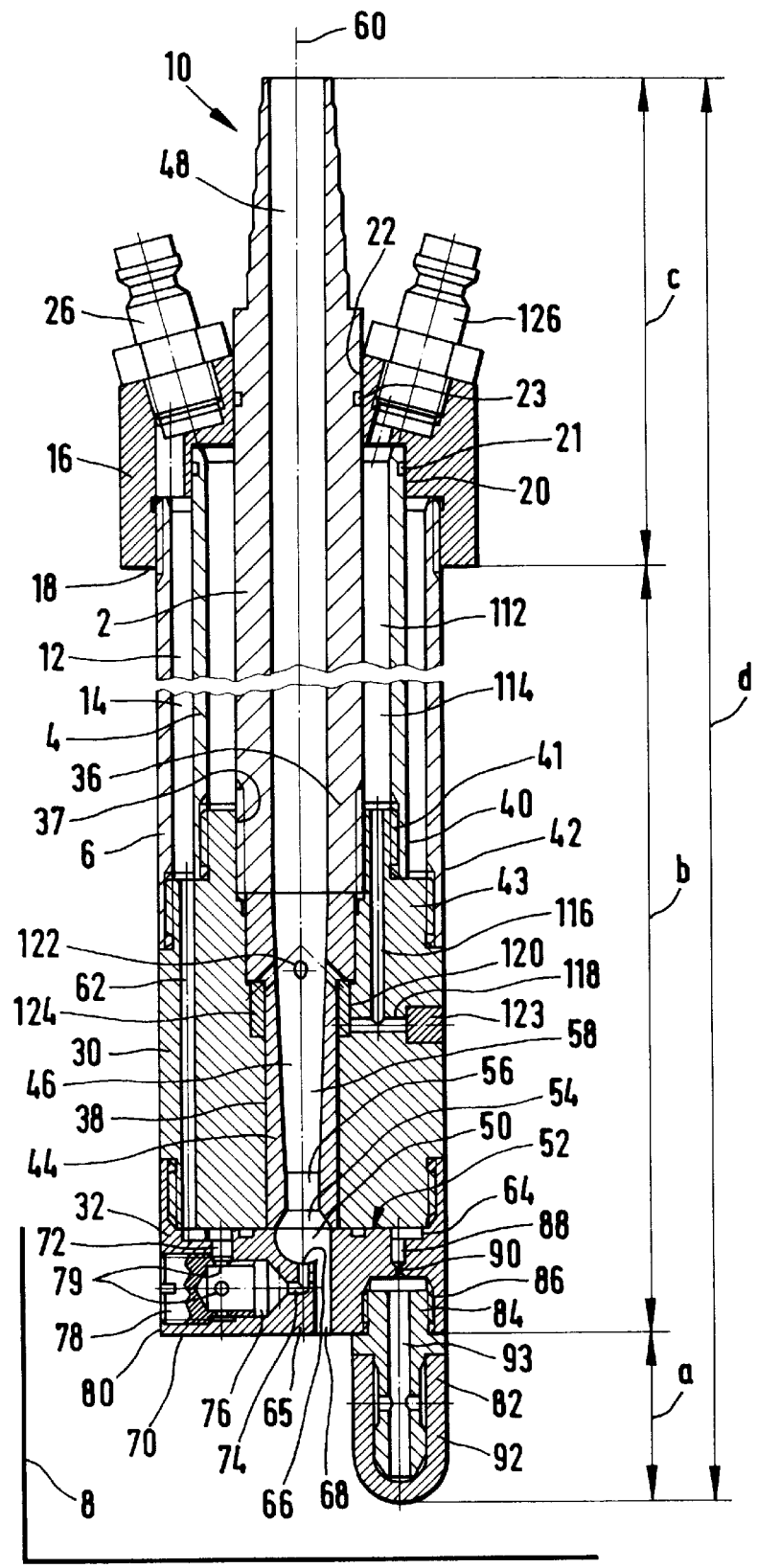
FIG. 1 is a vertical cross sectional view through a powder spray-coating injector device according to the invention, which substantially is cylindrical overall.

The powder spray-coating injector device of the invention illustrated in the drawing figures includes an inner powder tube 2, an intermediate tube 4 and an outer tube 6, all of approximately same length, which are coaxially positioned and radially spaced. The injector device can be vertically, slanted or crosswise immersed in a powder container 8 (shown diagrammatically in fragmentary) in order to fluidize coating powder and to feed such fluidized powder to a known spray device (not shown) for spraying the coating powder at an article being coated. On a downstream, rear end 10 of the injector device, that is, the top end in FIG. 1, the intermediate tube 4 protrudes beyond the outer tube 6, and the powder tube 2 protrudes beyond intermediate tube 4. The rear end of powder tube 2 has an offset, rearwardly tapering outer circumference for slip-on connection of a hose which connects to the powder spray-coating device. An annular space between the intermediate tube 4 and the outer tube 6 forms a first section 12 of a first compressed air duct 14. An annular rear section 16 is secured by means of a screw thread 18 to the rear end of outer tube 6. Inner shoulders 20 and 22 on the rear section 16 slip over and form air tight seals to the rear ends of the intermediate tube 4 and the powder tube 2. These parts are thereby retained, axially and radially, in relative positions to one another. A ring seal 21 is located between the shoulder 20 and the intermediate tube 4 and a ring seal 23 is located between the shoulder 22 and the powder tube 2 to prevent air leakage therebetween. The rear section 16 bounds the rear end of the first section 12 of the first compressed air duct 14 and is provided with a first compressed air connection 26 by means of which a compressed air source (not shown) can be connected to the first compressed air duct 14.

On its upstream, front end 36, i.e., the bottom end as oriented in the drawing figures, the powder tube 2 is somewhat longer than the intermediate tube 4, and the outer tube 6 is longer than the powder tube 2. The three tubes 2, 4 and 6 are mechanically and fluidically connected via a tubular front adapter 30 to an injector head or front section 32. The adapter 30 and the front section 32 have the same circular outside diameters as the outside diameter of outer tube 6, which is axially aligned with them. The front end 36 of the powder tube 2 is screwed into a rear tapped section 37 of a stepwise, downwardly or forwardly tapering through bore 38 of the adapter 30. A front end 40 of the intermediate tube 4 is screwed on a rear shoulder 41 of the adapter 30. A front end 42 of the outer tube 6 is screwed on a center shoulder 43 on a rear end of the adapter 30. A replaceable injector sleeve 44 is inserted in the through bore 38 from the rear (top) to the front (bottom) end. The injector sleeve 44 forms an injector duct 46 which connects a powder tube duct 48 in the tube 2 to an injector vacuum chamber 50. The vacuum chamber 50 is formed by a flared rim 54 of the injector duct 46 which flares in funnel fashion and by an opposing hemispherical depression 55 in the upward-pointing rear face 52 of the front section 32. The injector duct 46 has downstream, after the opening rim 54, successively a short cylindrical duct section of constant cross section and then a rear duct section 58 extending along most of its length and flaring in funnel fashion in the direction of flow, while extending up to the powder tube duct 48.

The front adapter 30 retains the front ends of tubes 2, 4 and 6 in a specific position relative to one another and bounds the front end of the first section 12 of the first compressed air duct 14. The powder tube 2 and the injector duct 46 have a common center axis 60. A bore forming a second section 62 of the first compressed air duct 14 is formed in adapter 30 parallel to injector duct 46. The second section 62 of the first compressed air duct 14 extends through the entire length of the front adapter 30 and fluidically connects the first section 12 of the first compressed air duct 14 to an annular duct 64. The annular duct 64 is fashioned in the form of an annular groove, coaxially with the center axis 60, in the downstream rear end face 52 of the end section 32 (and/or in an adjacent end face of the adapter 30) The first compressed air duct 14 empties into the annular duct 64.

Figure 2:
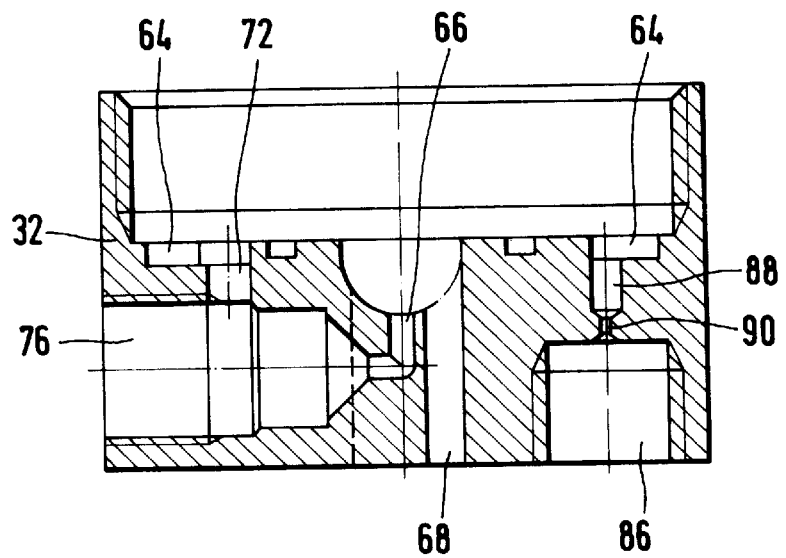
FIG. 2 is an enlarged cross sectional view through the front end section of the device of FIG. 1.
Figure 3:
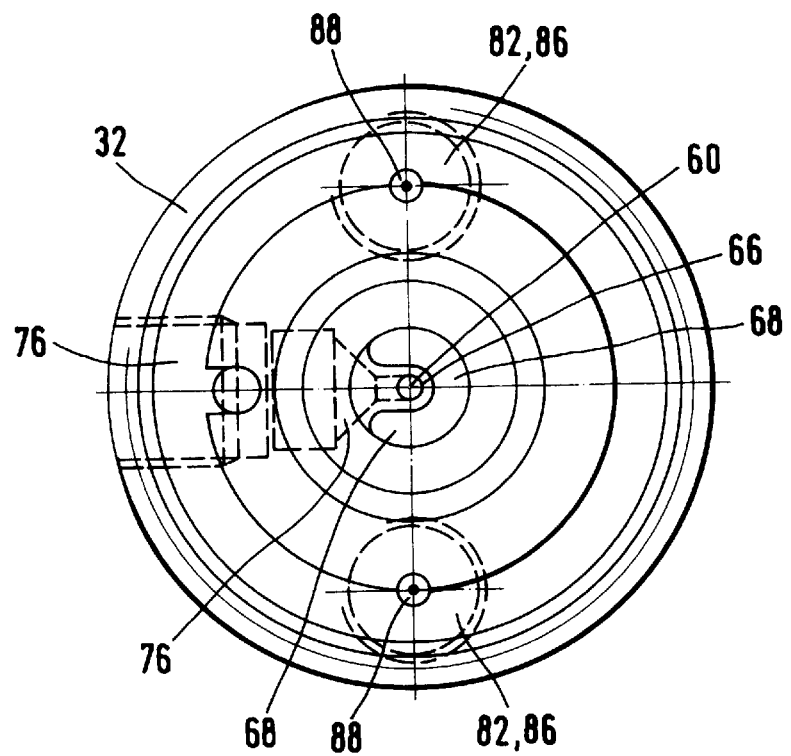
FIG. 3 is a top plan view of a modified embodiment of the front end section of FIG. 1 with two fluidizing devices, whereas the embodiment of FIGS. 1 and 2 illustrate only one fluidizing device.

According to FIGS. 1 through 3, an injector nozzle 65 is formed in the front section 32. The nozzle 65 has an injector nozzle opening 66 at a bottom of the hemispherical vacuum chamber 50. The injector nozzle opening 66 extends axially in relation to the center axis 60. The direction of flow of air discharged from the nozzle opening 66 is axially into injector duct 46. The injector nozzle opening 66 is surrounded by a radially spaced powder intake duct 68 which in horizontal section has the shape of a horseshoe, as best seen in FIG. 3. The powder intake duct 68 extends from an upstream front (i.e., bottom in FIG. 1) end face 70 of the front section 32, parallel to the center axis 60, rectilinearly up into injector vacuum chamber 50 while arranged tangential to the wall of said vacuum chamber 50. A bore 72 arranged in the front section 32 parallel to the center axis 60 and extending away from annular duct 64, as third duct section, intersects with a bore 74 arranged in the front section 32 as a fourth section of the first compressed air duct 14. The fourth duct section 74 empties in the nozzle duct of the injector nozzle opening 66. A powder filter 76 of microporous material is contained in the intersection area between the third section 72 and the fourth section 74. The filter 76 serves to prevent any backflow of coating powder from the injector nozzle opening 66 into the first compressed air duct 14. The intersection area between the third section 72 and the fourth section 74 of the first compressed air duct 14 is sealed from the outside of the end section 32 by a hollow screw plug 78 that features through bores 79 serving to connect the third section 72 to the fourth section 76. The plug 78 can be unscrewed for replacement of powder filter 76. The compressed air from the first compressed air duct 14 issuing out of injector nozzle opening 66 generates in the vacuum chamber 50 a suction, by which coating powder is suctioned from the powder container 8 through the powder intake duct 68 and into the injector duct 46, and is carried by the compressed airflow through the powder tube 2 to the spray device.

At least one exchangeable fluidizer 82 which is permeable to air extends from the front face 70 of the end section 32. The fluidizer 82 is contained within the outer circumference of the end section 32. The fluidizer 82 has a screw base 84 fitted in a tapped blind hole 86 formed in the front face 70 which extends parallel to the center axis 60. A fluidizing air bore 88 extends from the bottom of tapped blind hole 86 parallel to the center axis and into the annular duct 64. Therefore, part of the compressed air from the first compressed air duct 14 flows from the annular duct 64 through the fluidizing air bore 88 and then through the air-permeable fluidizer 82 out of the injector device and into the powder container 8. The fluidizing air bore 88 acts as a throttle to the flow and/or contains a preferably exchangeable throttle orifice 90 for adjustment of the share of fluidizing air split off the air carried in the first compressed air duct 14.

The fluidizer 82 may be integral or of a multipart design. The fluidizer 82 preferably consists of a hood type fluidizer element 92 of air-permeable microporous material and the screw base 84 fitted in it. The screw base 84 is of a material not permeable to air, but having ducts 93 through which the fluidizing air flows to bordering inside surfaces of the air-permeable microporous fluidizer element 92. The fluidizer 82 and the separate fluidizer elements 92 are commercially available and, thus, inexpensive parts, which are used in other applications, for example, as a compressed air muffler. According to FIGS. 1 and 2, it is possible to use only a single fluidizer 82. According to other embodiments, several fluidizers 82 may be spaced around the center axis 60 and may fluidically connect via separate fluidizing air bores 88 to the annular duct 64.

From the FIG. 3 plan view of the downstream rear end face 52 of the front section 32, it follows that two fluidizers 82 may be arranged diametrically to the center axis 60 and offset, each, by 90° in peripheral direction about the center axis 60, to the horizontal fourth section 74 of the first compressed air duct 14. Thus FIGS. 1 and 2 may represent one embodiment and FIG. 3 another embodiment. In the present case, however, it is assumed that FIGS. 1, 2 and 3 shows a single embodiment, with FIGS. 1 and 2 showing one of the two fluidizers 82 offset 90° in relation to the center axis 60, in order to be able to show all flow paths in one drawing plane.

An annular space between the powder tube 2 and the intermediate tube 4 forms a first section 112 of a second compressed air duct 114. The first section 112 is bounded on its sides by the two tubes 2 and 4 as well as on its ends by the rear section 16 and front adapter 30. The second compressed air duct 114 features successively a second section 116 bordering on the first section 112, in the form of a blind hole that is axially parallel to the center line 60, a third section 118 perpendicular to the center axis 60 which intersects the bottom of blind hole 116, a fourth section 120 in the form of an annular duct between the connector 30 and the injector sleeve 44 coaxial with center axis 60, and a fifth section 122 in the form of several bores which fluidically connect from the fourth section 120 to the powder tube duct 48. The bores of the fifth section 122 are arranged conically oblique to the center axis 60 with the cone tip pointing in the direction of powder flow in the powder tube 2. The fourth section 120 is filled up by a powder filter 124 in the form of an annular element of microporous, air-permeable material. The powder filter 124 prevents any backflow of powder from the powder tube 2 into the second compressed air duct 114. The blind bore of the second compressed air duct 114 is outwardly sealed by a plug 123 and extends perpendicular to the center axis to form the third section 118. The rear section 16 is provided with a second compressed air connection 126 by way of which a compressed air source (not shown) may be connected to the first section 112 of the second compressed air duct 114. The compressed air source may be same as is connected also to the first section 12 of the first compressed air duct 14, but preferably via pressure adjustment devices and/or flow adjustment devices.

FIG. 1 shows the injector device according to the preferred embodiment at substantially 1:1 scale, with the tubes 2, 4 and 6 cut away and, therefore, shown truncated. The illustrated embodiment measures: a=24 mm, b=510 mm, c=70 mm and d=604 mm. FIGS. 2 and 3 are shown at 2:1 scale.

Preferably, the powder tube 2 is made of polypropylene, the injector sleeve 44 is of Teflon (polytetrafluoroethylene) so as to avoid powder crusting to it, and the rear (i.e., top) section 16, the adapter 30, the front section 32, the intermediate tube 4 and the outer tube 6 are each of aluminum.

According to a not illustrated embodiment of the injector device, the first section 112 of the first compressed air duct 14 is not formed between intermediate tube 4 and outer tube 6, but is formed between the powder tube 2 and the intermediate tube 4. Here, the first section 112 of the second compressed air duct 114 is formed between the intermediate tube 4 and the outer tube 6, in which case the second sections 62 and 116 of the first and second compressed air ducts 14 and 114 are switched.

The injector device also can be described as a powder immersion pump, which on the bottom end of an arrangement of several coaxially nested tubes has an injector pump or suction jet pump.

Figure 4:
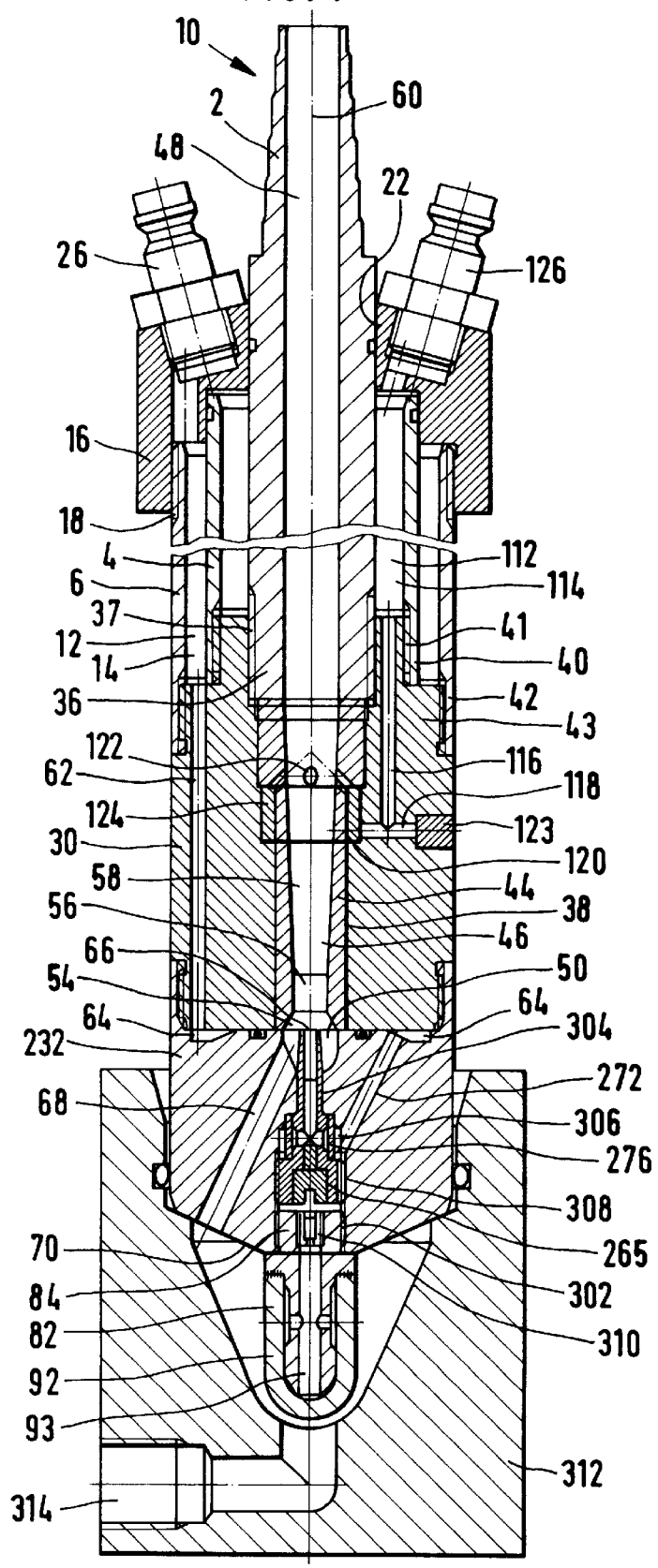
FIG. 4 is a vertical cross sectional view of a modified embodiment of an injector device according to the invention.
Figure 5:
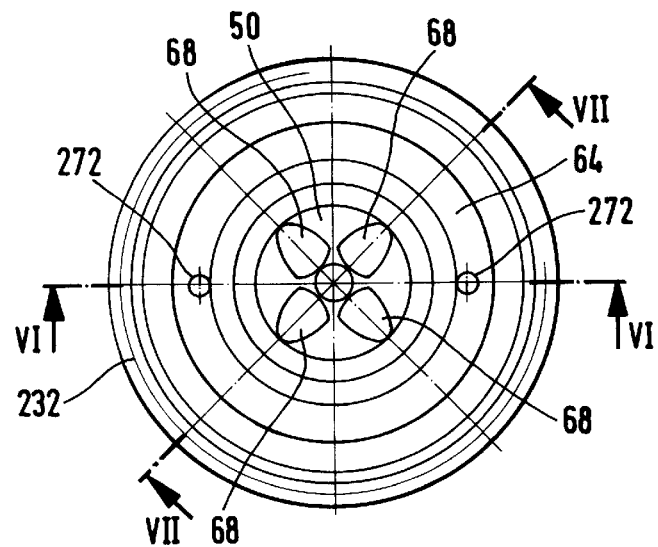
FIG. 5 is a top plan view of the downstream end face of the front end section of the injector device of FIG. 4.
Figure 6:
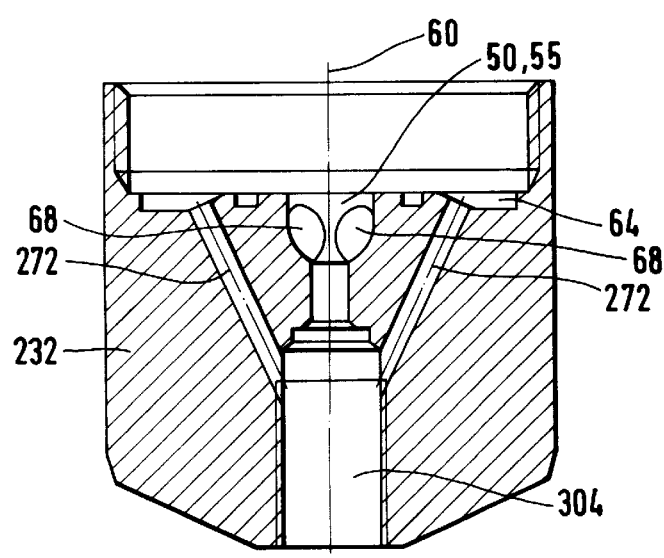
FIG. 6 is a cross sectional view as taken along line VI—VI in FIG. 5.
Figure 7:
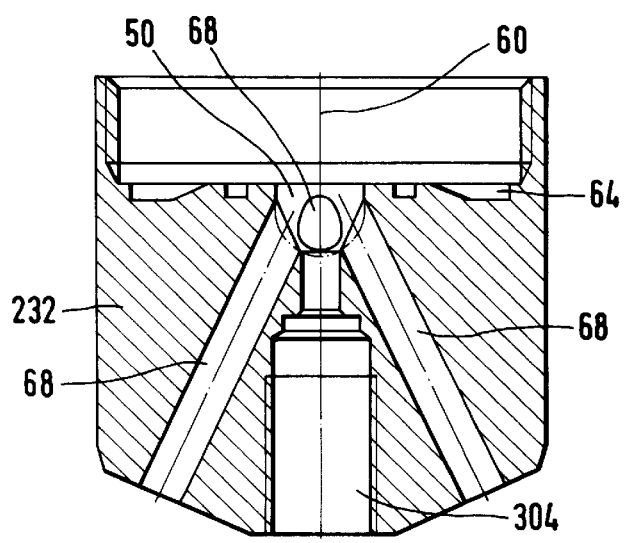
FIG. 7 is a cross sectional view as taken along line VII—VII in FIG. 5.
Figure 8:
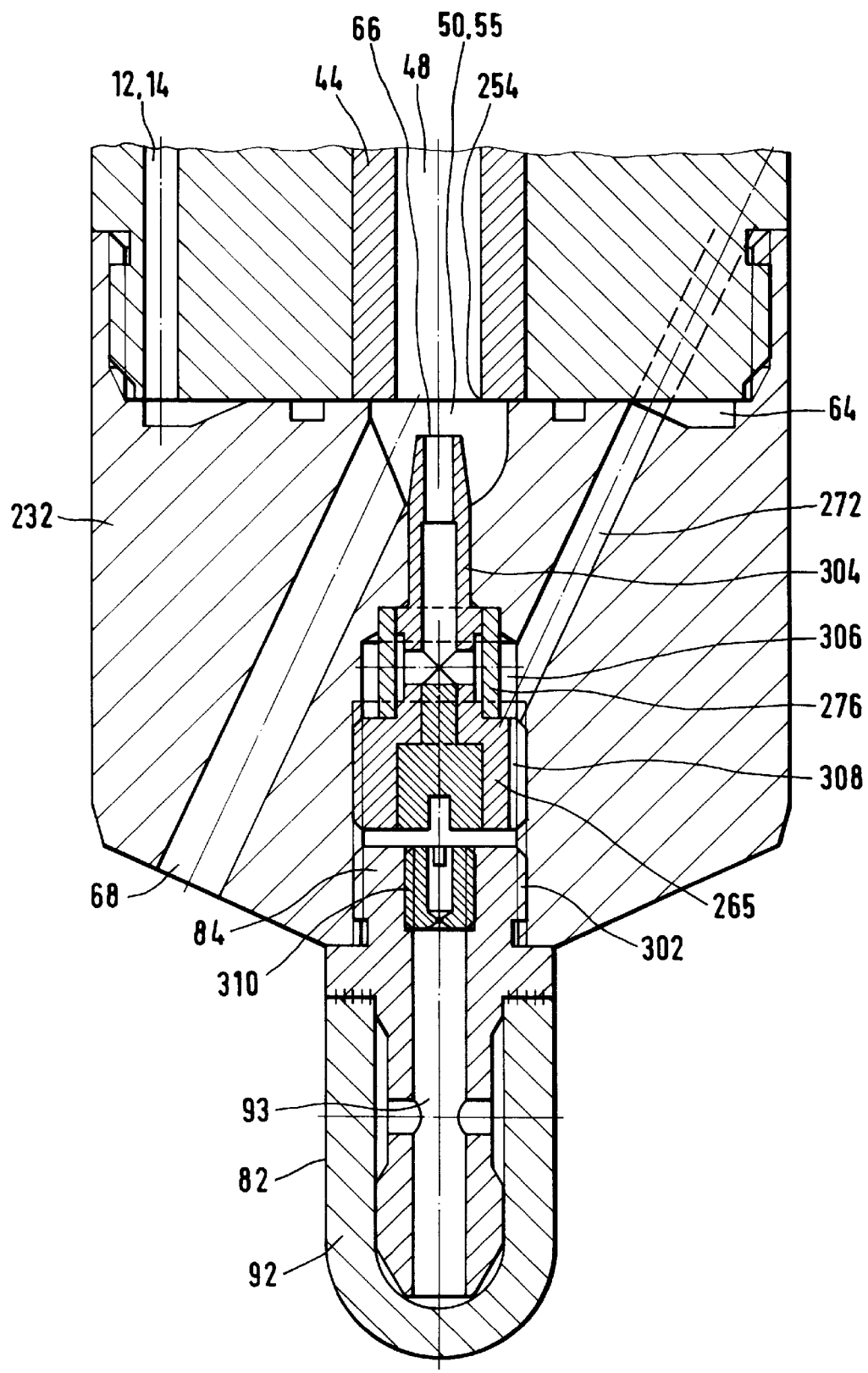
FIG. 8 an enlarged fragmentary cross sectional view of part of a further modified embodiment of an injector device similar to the device shown in FIG. 4.

According to a further embodiment of the invention, the injector nozzle opening 66 is not formed by the front section 32, but by an injector nozzle inserted in the front section 32 at the same location as shown in FIGS. 4 and 8. The injector nozzle is preferably exchangeable. The following describes the two further embodiments, according to FIGS. 4 through 7 and FIG. 8, only insofar as they differ from the embodiment according to FIGS. 1 through 3. Parts identical with those in FIGS. 1 through 3 are referenced identically in FIGS. 4 through 8. This shows that in FIGS. 4 through 8 only an upstream front section 232 and an injector nozzle 265, exchangeably fitted in it, differ from the upstream front section 32 and injector nozzle 65 integral with it of FIGS. 1 through 3.

The embodiments of FIGS. 4 and 8 differ only in that in FIG. 4 a longer injector nozzle 265 is used. The nozzle opening 66 is disposed in the parting plane between the front section 232 and the adapter 30, whereas a shorter injector nozzle 265 is used in FIG. 8, whose nozzle opening 66 is relative to the parting plane set back, upstream, in front section 232. In FIG. 8, furthermore, the upstream opening rim 254 of the exchangeable injector sleeve 44 is sharp-edged, whereas in the other embodiments it is funnel-shaped. The two injector nozzles 265 of FIG. 4 and 8 are mutually exchangeable.

The injector nozzle 265 is exchangeably screwed in a tapped section 302 of an axial through bore 304 formed in the front section 232. After the injector nozzle 265 is attached to the screw base 84 of a fluidizer 82, the injector nozzle 265 is screwed into a tapped section 302. The fluidizer element 92 of microporous, air-permeable but powder-blocking material protrudes beyond the upstream front face 70 of the front section 232. The front face 70 of the front section 232 is conical across its entire expanse toward fluidizer 82, with its apex disposed on the center axis 60.

Several rectilinear bores 272 are fashioned in the front section 232 and are distributed evenly around the center axis 60. Each of the bores 272 forms a third section of the first compressed air duct 14 and extends from the annular duct 64 up into an annular chamber 306 formed between injector nozzle 265 and the wall of the through bore 304 of the front section 232. Compressed air from the first compressed air duct 14 proceeds from the annular chamber 306 through a filter 276 of a powder coating material impermeable microporous material, and through subsequent radial bores into the nozzle duct of the injector nozzle opening 66. Moreover, compressed air from the annular chamber 306 proceeds via grooves 308 fashioned in the outer periphery of the injector nozzle 265 and through a fluidic throttle 310 in the screw base 84 into the fluidizer 82 and through its fluidizer element 92 to the atmosphere of the injector device. The throttle 310 is exchangeably fitted in the screw base 84.

Several rectilinear bores form powder intake ducts 68. The ducts 68 are oriented obliquely relative to the center axis 60 and perpendicularly to the beveled front face 70. The ducts 68 extend up into the injector vacuum chamber 50 and are distributed evenly about center axis 60. In all of the embodiments, no additional space, such as for instance the depression 55, needs to be provided for the injector vacuum chamber 50. However, it may be formed by the upstream parts 54 and 56 of injector duct 46.

The fluidizer element 92 is finely porous to allow the fluidizing air to escape to the atmosphere only at low velocity, in cloud fashion. The escaping air fluidizes the adjacent powder, keeping it in a suspended state for easy suctioning by the powder intake ducts 68. The cloud like and gentle distribution of the fluidizing air allows arranging the inlet openings of the powder intake ducts 68 near the fluidizer element 92, thereby giving the injector device an overall slender shape with a small outside diameter.

In all of the embodiments relative to FIGS. 1 through 8, the compressed air is fed from the annular duct 64 both to the injector nozzle 65 and 265, as carrier air, and also to the fluidizer 82 as fluidizing air. The injector device requires for that purpose overall only a single compressed air source which can be connected to the connection 26.

In all of the embodiments relative to FIGS. 1 through 8, the adapter 30 is tapped and detachably screwed or otherwise detachably secured to the tubes 2, 4 and 6 as well as to the front section 32, or 232.

To scavenge the injector device with compressed air for removal of all powder particles, a purging cap 312 can be slipped on front section 32 or 232, according to FIG. 4. The purging cap 312 covers the powder intake duct 68 and the fluidizers 82 while skipping an intervening space. Thus, the cap 312 shields the covered surfaces entirely or in part relative to the atmosphere. A through duct 314 in the purging cap 312 can be connected to a compressed air source (not illustrated) so as to blow compressed air through the through duct 314, the fluidizer element 92, the injector nozzle 65 or 265, and the powder tube duct 48. This air flow removes any powder residues from the surfaces and the ducts and thereby cleans the device. The compressed air of the first and second compressed air ducts 14 and 114 may remain turned on during this scavenging operation in order to create suction for removing loosened powder residues.

It will be appreciated that various modifications and changes may be made to the above described preferred embodiment of without departing from the scope of the following claims.

I claim:

1. An injector device for powder spray coating material comprising an adapter having an injector duct which extends between first and second ends and having at least one compressed air duct extending to said first end, said injector duct having a straight axis and terminating at a vacuum chamber adjacent said first end, a front section attached to said first end of said adapter, said front section having an injector nozzle with a nozzle orifice located on said axis and adapted to direct a flow of powder conveying air received from said at least one compressed air duct in said adapter axially into said injector duct, such flow of powder conveying air creating a reduced pressure in said vacuum chamber, at least one powder intake duct extending through said front section to a front face and connecting to said vacuum chamber, and at least one fluidizer on said front face of said front section having a plurality of small air passages adapted to discharge fluidizing air received from said at least one compressed air duct in said adapter into a space adjacent said front section to fluidize powder in such space.

2. An injector device for powder spray coating material, as set forth in claim 1, and wherein said vacuum chamber extends between said adapter and said front section.

3. An injector device for powder spray coating material, as set forth in claim 1, and wherein said powder intake duct is generally semicircular in cross section in a direction perpendicular to said axis and wherein said powder intake duct extends partially around said axis.

4. An injector device for powder spray coating material, as set forth in claim 3, and wherein said at least one fluidizer comprises two fluidizers spaced on said front face on diametrically opposite sides of a powder inlet end of said powder intake duct.

5. An injector device for powder spray coating material, as set forth in claim 1, and wherein said front section is threaded onto said adapter.

6. An injector device for powder spray coating material, as set forth in claim 5, and further including a replaceable injector sleeve positioned in said injector duct, said injector sleeve having an axial bore through which fluidized powder is conveyed, and a plurality of powder conveying air bores in said injector sleeve adapted to direct flows of powder conveying air in a conically oblique direction relative to said axis in the direction in which powder is conveyed.

7. An injector device for powder spray coating material, as set forth in claim 6, and further including a powder duct tube threaded to said adapter second end coaxial with said injector duct, an intermediate tube having a diameter larger than said powder duct tube threaded to said adapted second end coaxial with said powder duct tube, and an outer tube having a diameter larger than said intermediate tube threaded to said adapter second end coaxial with said intermediate tube, said powder duct tube and said intermediate tube are spaced apart to define a first pressurized air space adapted to carry pressurized air for said powder conveying air bores in said injector sleeve, and a passage in said adapter connecting said first pressurized air space with said powder conveying air bores.

8. An injector device for powder spray coating material, as set forth in claim 7, and further including a filter located between said adapter and said injector sleeve, said filter passing pressurized air from said adapter passage to said powder conveying air bores while preventing the passage of powder from said powder conveying air bores to said adapter passage.

9. An injector device for powder spray coating material, as set forth in claim 8, and wherein said injector sleeve and said filter are removable from said injector duct at said second end of said injector duct, and wherein said powder duct tube retains said injector sleeve and said filter in said injector duct when said powder duct tube is threaded to said adapter.

10. An injector device for powder spray coating material, as set forth in claim 7, and wherein said intermediate tube and said outer tube are spaced apart to define a second pressurized air space adapted to carry pressurized air for said fluidizer and for said nozzle orifice, a passage in said adapter connecting said second pressurized air space to said fluidizer, and a passage in said adapter connecting said second pressurized air space to said nozzle orifice.

11. An injector device for powder spray coating material, as set forth in claim 1, and wherein said front face of said front section is generally conical, wherein said fluidizer is located on said axis at an apex of said conical front face, and wherein said powder intake duct extends to said conical front face adjacent said fluidizer.

* * * * *